July 19, 1932.  W. H. COOPER  1,867,656

PISTON RING

Filed Feb. 24, 1931

INVENTOR
Waldren H. Cooper
BY
ATTORNEY

Patented July 19, 1932

1,867,656

UNITED STATES PATENT OFFICE

WALDREN H. COOPER, OF PARKERSBURG, WEST VIRGINIA

PISTON RING

Application filed February 24, 1931. Serial No. 517,757.

My invention relates to sealing devices and more particularly to piston rings for sealing pistons in their reciprocating movement in cylinders.

The principal object of my invention is to provide a sectional ring that is urged uniformly throughout its circumference against the cylinder wall of an engine, or air compressor, thereby preventing uneven wear of the cylinder wall and ring.

A further object is to provide a sectional ring including a spring member mounted in spaced relation with the cylinder wall to prevent excessive heating of the spring member and consequent loss of resiliency.

Another object of my invention is to provide a ring of this character that will give unusually long service due to its rugged structure and large cross sectional area, and that is therefore particularly adapted for use in heavy duty engines and air compressors.

In accomplishing these and other objects of my invention I have provided improved details of structure, the preferred form of which is illustrated in the accompanying drawing, wherein.

Figure 1:
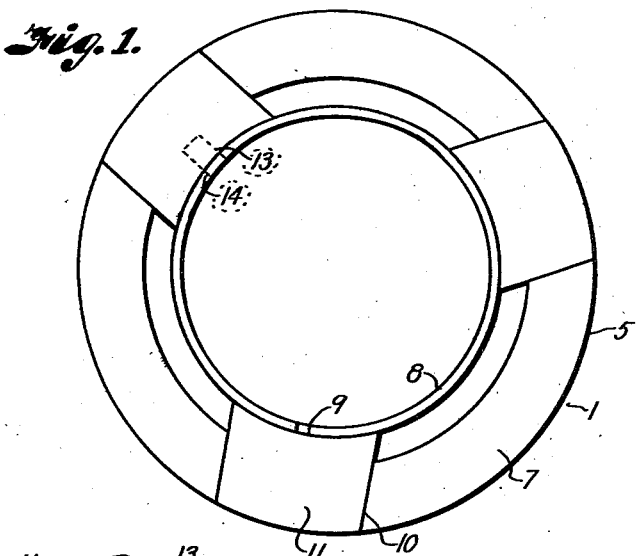
Fig. 1 is a plan view of the ring in assembled condition.
Figure 2:
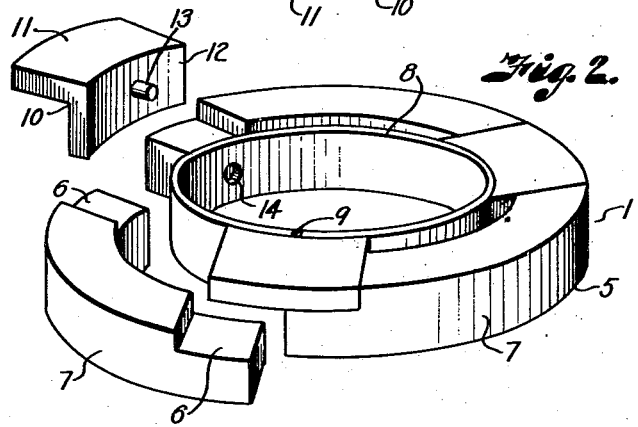
Fig. 2 is a detail perspective view of the ring with an outer ring segment and pressure block shown in disassembled relation with the ring to more clearly disclose the ring structure.
Figure 3:
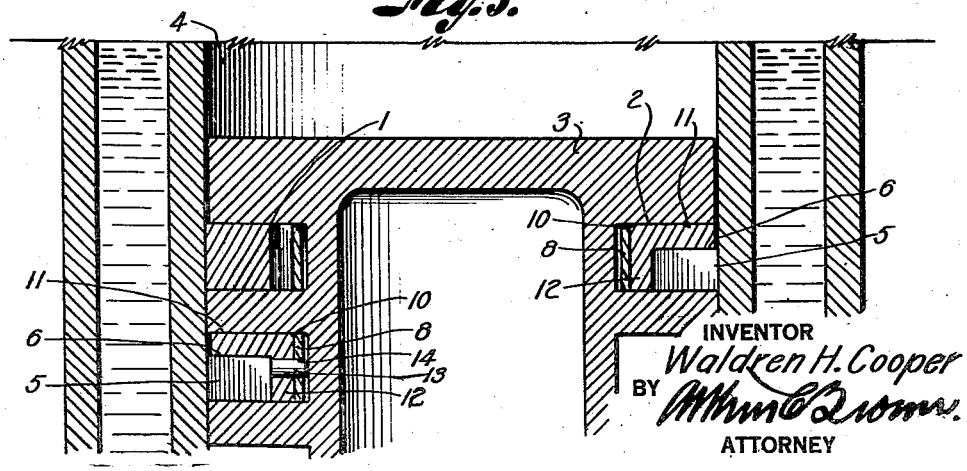
Fig. 3 is a longitudinal, sectional view of a portion of a cylinder and of a piston and reciprocably mounted within the cylinder and provided with piston rings embodying my invention.

Referring more in detail to the drawing:

1 designates a piston ring assembly adapted to be installed in annular grooves 2 of a piston 3 for sealing the sliding movement of the piston in a cylinder 4.

The piston ring assembly comprises an outer ring 5 provided with a plurality of equally spaced radial recesses 6 in one of its side faces and dissected on a center line of each recess to form arcuate segments 7. Located concentrically within the outer ring and spaced therefrom is an inner annular ring 8 formed of spring metal split transversely to produce a joint 9. The inner ring exerts pressure against the outer ring by means of angular blocks 10, each having a radial plane flange 11 adapted to seat in the combined recesses of abutting ends of adjacent segments 7, and a radial arcuate flange 12 adapted to be inserted within the space between the inner and outer rings.

One of the pressure blocks is preferably provided with a dowel pin 13 aligning with an opening 14 in the inner ring to prevent independent rotation of the inner and outer rings, the opening in the inner ring being so located that the joint of said ring will be positioned intermediate the ends of one of the other pressure blocks.

Assuming a device to be constructed as described, the procedure for assembling a ring on a piston and the action of the piston ring against the cylinder wall would be as follows:

In mounting the ring in the groove of a piston the inner ring of spring metal is expanded and forced over the piston head until it aligns with one of the ring grooves, whereupon it is permitted to contract and seat within the groove.

The pressure block having the dowel pin is next inserted in the groove with the pin extending through the complementary opening of the inner ring. The other pressure blocks are then arranged in equally spaced relation with the first block and the outer ring segments are positioned in the grooves with the recesses receiving the lateral flanges of the blocks.

The piston with its assembled rings is next inserted in a cylinder. Due to the uniform thickness of the inner spring metal ring an equal amount of pressure will be exerted on each of the pressure blocks and consequently the outer ring segments will be urged uniformly against the cylinder wall causing an even wear of the ring and likewise an even wear of the cylinder wall.

One of the principal advantages of this ring, over commonly used rings comprising a single ring of spring metal, is the remote position of the inner spring ring from the cylinder wall, thus preventing direct contact of excessive heat with the ring and resultant loss of resiliency.

Also, due to this spacing of the ring from the cylinder wall there will be no wear on the inner ring nor loss of resiliency due to the ring becoming thinner, as always occurs when the resilient piston ring directly engages the cylinder wall.

What I claim and desire to secure by Letters Patent is:

1. In a device of the character described, an outer ring split transversely to form segments, an inner resilient split ring spaced concentrically from the outer ring, blocks between the inner and outer rings in locking engagement with the outer ring, and means on one of said blocks engaging the inner ring for preventing independent rotation of the inner and outer rings.

2. In a device of the character described, an outer ring split transversely to form segments, said segments having transverse recesses adjacent their ends, a resilient split inner ring spaced from the outer ring and having an opening, blocks between the outer and inner rings having radial flanges adapted to seat in said recesses for overlapping the joint of the ring, and a pin projecting from one of said blocks and adapted to extend through the opening of the inner ring to prevent independent rotation of the inner and outer rings.

In testimony whereof I affix my signature.

WALDREN H. COOPER.